United States Patent
Knoblauch et al.

(10) Patent No.: US 9,905,039 B2
(45) Date of Patent: Feb. 27, 2018

(54) VIEW INDEPENDENT COLOR EQUALIZED 3D SCENE TEXTURING

(71) Applicant: QUALCOMM Incorporated, San Diego, CA (US)

(72) Inventors: Daniel Knoblauch, San Diego, CA (US); Alessandro Mulloni, Vienna (AT); Daniel Wagner, Vienna (AT)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 14/625,465

(22) Filed: Feb. 18, 2015

(65) Prior Publication Data

US 2015/0243069 A1    Aug. 27, 2015

Related U.S. Application Data

(60) Provisional application No. 61/943,246, filed on Feb. 21, 2014.

(51) Int. Cl.
| | |
|---|---|
| *G06K 9/36* | (2006.01) |
| *G06T 15/04* | (2011.01) |
| *G06T 5/00* | (2006.01) |
| *G06T 17/10* | (2006.01) |
| *G06T 17/20* | (2006.01) |
| *G06T 11/00* | (2006.01) |

(52) U.S. Cl.
CPC .............. *G06T 15/04* (2013.01); *G06T 5/003* (2013.01); *G06T 11/001* (2013.01); *G06T 17/10* (2013.01);

(Continued)

(58) Field of Classification Search
None
See application file for complete search history.

(56) References Cited

U.S. PATENT DOCUMENTS

| | | | |
|---|---|---|---|
| 2003/0016217 A1* | 1/2003 | Vlachos | G06T 17/20 345/423 |
| 2005/0031194 A1 | 2/2005 | Lee et al. | |

(Continued)

OTHER PUBLICATIONS

Neugebauer, Peter J., and Konrad Klein. "Texturing 3d models of real world objects from multiple unregistered photographic views." Computer Graphics Forum. vol. 18. No. 3. Blackwell Publishers Ltd, 1999.*

(Continued)

*Primary Examiner* — Sean Conner

(57) ABSTRACT

One disclosed example method for view independent color equalized 3D scene texturing includes capturing a plurality of keyframes of an object; accessing a 3D representation of the object comprising a surface mesh model for the object, the surface mesh model comprising a plurality of polygons; for each polygon, assigning one of the plurality of keyframes to the polygon based on one or more image quality characteristics associated with a portion of the keyframe corresponding to the polygon; reducing a number of assigned keyframes by changing associations between assigned keyframes; and for each polygon of the surface mesh model having an assigned keyframe: equalizing a texture color of at least a portion of the polygon based at least in part on one or more image quality characteristics of the plurality of keyframes associated with the polygon; and assigning the equalized texture color to the 3D representation of the object.

24 Claims, 12 Drawing Sheets

(52) U.S. Cl.
CPC ........ *G06T 17/205* (2013.01); *G06T 2200/04* (2013.01); *G06T 2200/28* (2013.01); *G06T 2210/61* (2013.01)

(56) References Cited

U.S. PATENT DOCUMENTS

| | | |
|---|---|---|
| 2008/0181486 A1 | 7/2008 | Spooner et al. |
| 2008/0247636 A1 | 10/2008 | Davis et al. |
| 2009/0189888 A1 | 7/2009 | Dollner |
| 2011/0134117 A1 | 6/2011 | Uesaki |
| 2013/0215239 A1 | 8/2013 | Wang et al. |

OTHER PUBLICATIONS

Alshawabkeh, Y., et al., "Automatic Multi-Image Photo-Texturing of Complex 3D Scenes", International Symposium CIPA 2005, Sep. 26, 2005 (Sep. 26, 2005), pp. 1-6.

Carranza, J., et al., "Free-Viewpoint Video of Human Actors", Proceedings of ACM SIGGRAPH 2003—Session: Human Bodies, ACM Transactions on Graphics (TOG), vol. 22, No. 3, Jul. 1, 2003 (Jul. 1, 2003), 9 pages.

Gruen, A., et al., "Automatic Reconstruction and Visualization of a Complex Buddha Tower of Bayon, Angkor, Cambodia", Proceedings 21, Wissenschaftlich-Technische Jahrestagung der DGPF, Sep. 1, 2001 (Sep. 1, 2001), pp. 289-301.

International Search Report—PCT/US2015/016875—ISA/EPO—Jun. 10, 2015.

Matsuyama, T., et al., "Generation, visualization, and editing of 3D video", Proceedings, First International Symposium on 3D Data Processing Visualization and Transmission, Jun. 19-21, 2002, pp. 234-245.

Rocchini, C., et al., "Acquiring, stitching and blending diffuse appearance attributes on 3D models", The Visual Computer, vol. 18, No. 3, May 1, 2002 (May 1, 2002), pp. 186-204.

\* cited by examiner 3D model 430 including textures 131a-b(2) and 131e-f(2) from keyframe 420 and textures 131c-d(1) from keyframe 410 of polygon 133

VIEW INDEPENDENT COLOR EQUALIZED 3D SCENE TEXTURING

CROSS-REFERENCE TO RELATED APPLICATIONS

This application claims the benefit of U.S. Provisional Application No. 61/943,246, filed Feb. 21, 2014, entitled "View Independent Color Equalized 3D Scene Texturing," which is incorporated herein by reference in its entirety.

BACKGROUND

Devices such as RGB-D cameras or other sensing devices may be used to track objects in three-dimensional environments and to gather information for use in creating models of objects or scenes captured by the device. This captured information may be used for a variety of purposes where reconstruction of the imaged scene or an object in the scene is needed.

Vision based three-dimensional ("3D") systems that capture this type of information result in good geometrical representations of the objects of interest, but do not represent their colors well if they capture color information at all. Many previously known systems calculate colors for model vertices. This results in a blurry object when the model is viewed closely. Other known systems may use view dependent texturing to keep the scene representation as real as possible, but view dependent texturing may result in non-uniform characteristics across the model due to lighting, shadows, exposure time, and other issues that may vary across the multiple views that may be used to create a model. Known color correction systems which correct the color of the entire object do not adequately compensate for these issues.

Systems and methods for view independent color equalized 3D scene texturing may provide improvements in the color and overall model quality for reconstructions of 3D scenes or objects.

BRIEF SUMMARY

Various examples are described for view independent color equalized 3D scene texturing. One disclosed example method comprises capturing a plurality of keyframes of an object; accessing a three-dimensional ("3D") representation of the object comprising a surface mesh model for the object, the surface mesh model comprising a plurality of polygons; for each polygon in a first set of polygons of the plurality of polygons, assigning one of the plurality of keyframes to the polygon based on one or more image quality characteristics associated with a portion of the keyframe corresponding to the polygon; reducing a number of assigned keyframes by changing associations between assigned keyframes and for a second set of polygons of the plurality of polygons; and for each polygon of the surface mesh model having an assigned keyframe: equalizing a texture color of at least a portion of the polygon based at least in part on one or more image quality characteristics of the plurality of keyframes associated with the polygon; and assigning the equalized texture color to the 3D representation of the object. In another example, a computer-readable medium is encoded with program code to cause a processor to execute such a method.

Another disclosed example method for view independent color equalized three-dimensional scene texturing comprises capturing a plurality of keyframes of an object; accessing a three-dimensional ("3D") representation of the object comprising a surface mesh model for the object, the surface mesh model comprising a plurality of polygons; for each polygon in a first set of polygons of the plurality of polygons of the surface mesh model: identifying keyframes associated with the polygon; assigning one or more keyframes of the identified keyframes based on one or more image quality characteristics of the identified keyframes for a second set of polygons of the plurality of polygons; for each pixel of each polygon in the second set of polygons: calculating a weighted average texture color of the pixel based on texture colors of corresponding points on the object in each of the one or more assigned keyframes; and assigning the weighted average texture color to the 3D representation of the object. In another example, a computer-readable medium is encoded with program code to cause a processor to execute such a method.

One disclosed example system for view independent color equalized three-dimensional scene texturing comprising: a computer-readable medium; and an electronic processor in communication with the computer-readable medium, the electronic processor configured to: receive a plurality of keyframes of an object; access a three-dimensional ("3D") representation of the object comprising a surface mesh model for the object, the surface mesh model comprising a plurality of polygons; for each polygon in a first set of polygons of the plurality of polygons, assign one of the plurality of keyframes to the polygon based on one or more image quality characteristics associated with a portion of the keyframe corresponding to the polygon; reduce a number of assigned keyframes by changing associations between assigned keyframes for a second set of polygons of the plurality of polygons; and for each polygon of the surface mesh model having an assigned keyframe: equalize a texture color of at least a portion of the polygon based at least in part on one or more image quality characteristics of the plurality of keyframes associated with the polygon; and assign the equalized texture color to the 3D representation of the object.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Examples are described herein in the context of view independent color equalized 3D scene texturing. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Figure 1:
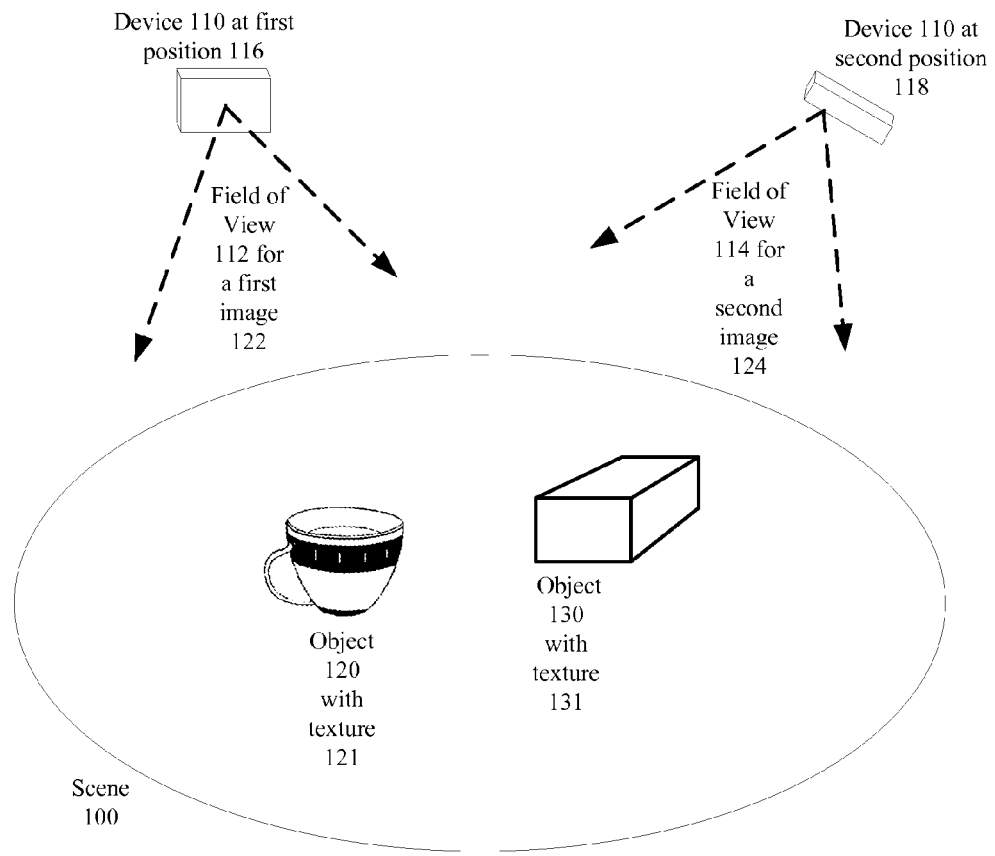
FIG. 1 shows an example scene.

The following describes an illustrative example method for view independent color equalized 3D scene texturing. In this example, multiple images are captured of a three dimensional object from different viewpoints (or perspectives). For example, FIG. 1 shows a scene 100 having two objects 120, 130, each of which has a respective texture 121, 131. Multiple images are captured of the scene 100 from different viewpoints 116, 118. For example, a camera device 110 may be used to capture images of the scene and may be moved to different locations to capture the scene from different viewpoints. Some or all of these images may then be designated as keyframes that may be used to provide information that can be used to determine view independent color equalized 3D scene texturing.

After the images of the objects 120, 130 have been captured, 3D mesh representations are generated for the entire scene captured in the image, such as triangular meshes, though in some cases a 3D mesh representation may be generated only for one or more objects. Then, for each polygon in the mesh for a particular object, such as object 130, one of the keyframes is identified as being the optimal keyframe for that polygon. Optimality of a keyframe in this case is determined based on one or more of a number of attributes of the polygon and the keyframe, referred to as image quality characteristics, such as whether the polygon is occluded in the keyframe or not, distance from the polygon to the camera device 110, the angle of the polygon with respect to the plane of the image, and a view error, which is based on a depth map and a pose of the object within the scene. Assuming a polygon is not partially or fully occluded in a particular keyframe, each of these parameters is weighted and used to calculate a score for each keyframe with respect to each polygon. For each polygon, the keyframe having the best score is assigned to the polygon.

After all polygons have been analyzed, the number of assigned keyframes is then reduced to reduce the computational complexity of the remainder of the process. For example, some of the assigned keyframes may only be assigned to a small number of polygons while others are assigned to a large number of polygons. Thus, it may be advantageous to identify those keyframes assigned to a relatively small number of polygons and to change the assignments of those polygons to a keyframe with a high number of assigned polygons, and then to eliminate the unneeded keyframe.

This process is likely to result in a polygon being assigned to a keyframe with a lower score than the originally-assigned keyframe, however, if a keyframe within an acceptable level of optimality from the previously-determined optimal keyframe is identified, the assignment for the polygon may be changed. Further, in some cases where no other acceptable keyframe is available, it may be preferable to eliminate the polygon and remove the assigned keyframe to obtain an improvement in computational efficiency. In some examples, up to an acceptable threshold number of polygons, such as 10%, may not have an assigned keyframe.

Once the number of keyframes has been reduced, a texture for each polygon may be determined based on its associated keyframe as described below. The textures for each polygon are then equalized using all available keyframes in which the polygon is not occluded. To determine a texture for a polygon, each vertex of the polygon is assigned a weighted texture color value based on all keyframes in which the polygon is not occluded and where the weights are based on the angle between the polygon's normal vector and the plane of the keyframe. For example, where the polygon's normal vector is perpendicular to the plane of the keyframe, the texture color value for the keyframe may be heavily weighted, while a keyframe that has an angle of incidence with respect to the polygon of 10 degrees may be assigned a very low weight. The weighted texture colors are summed and averaged to provide a texture color for the respective vertex.

A texture color equalization multiplier is then calculated using the weighted average texture color for each vertex by comparing the weighted average texture color for each vertex to a texture color of associated points on the object from the respective assigned keyframe. Once all of the vertices for the polygon have had a weighted texture color value assigned, when the polygon is later rendered, texture color values for pixels within the polygon are interpolated based on the texture colors of the vertices of the polygon and the texture color equalization multiplier. Thus, the texture colors for the vertices in the object's 3D mesh representation may be stored until the object is later rendered. Further, because the texture colors for the vertices in the 3D mesh are based on texture color information from multiple different perspectives, the color information better represents view-independent colors of the object.

Examples described herein may create 3D mesh models with specialized color equalization in the textures of specific polygons which are selected to create a view independent 3D mesh model. This enables color correction for view independent texturing of model polygons using textures aggregated from a number of keyframes that may have different image characteristics. This may further enable an accurate color representation of the object in the 3D model while compensating for contrast changes, lighting dependent color changes, or other issues that may impact the images used to create the 3D model. Additionally, examples described herein may improve computational complexity or efficiency by selecting data from images that are likely to best represent aspects of the 3D model while also reducing the number of images used to equalize color information for the 3D model.

3D models created according to example color equalization methods described herein may be used for photo realistic reconstructions of objects that can be used in virtual worlds, integrated into images or videos (in any desirable orientation) or even be used for color 3D printing.

Figure 2A:
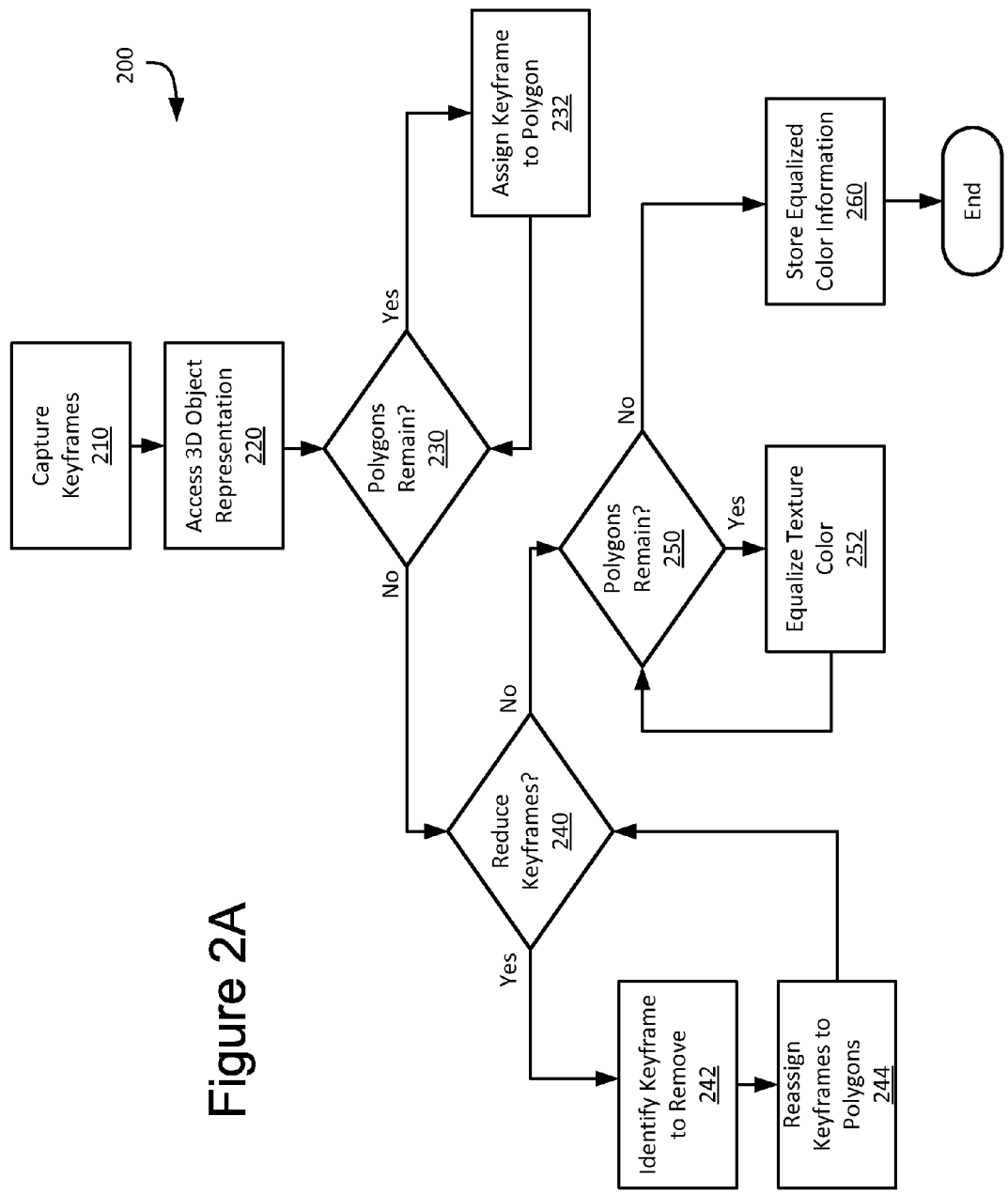
FIGS. 2A, 2B, and 3 show example methods for view independent color equalized 3D scene texturing.

Referring now to FIG. 2A, FIG. 2A shows an example method 200 for view independent color equalized 3D scene texturing. The method 200 of FIG. 2A may be performed by any suitable computing device or within a suitable computing environment, such as those discussed below with respect to FIGS. 7-9. As part of various examples, suitable devices or systems may be used. Certain examples may use aspects of SLAM (Simultaneous Location and Mapping) or PTAM (Parallel Tracking and Mapping) systems as means of identifying a camera pose or a position of the camera relative to a captured object or scene. Various alternative examples may also use these mapping systems to create a geometric model of a system, or for collecting various data that may be used for creation of a 3D model.

The method 200 of FIG. 2A begins in block 210 when a computing device, such as computing device 110, with a camera captures a plurality of keyframes of an object. In this example, the computing device 110 employs its camera, or other suitable means for capturing keyframes, to capture images of the object from multiple different perspective points. Referring again to FIG. 1, the scene 100 includes two objects 120, 130 and illustrates a computing device 110 capturing two different images of the objects 120, 130 from different positions 116, 118 and perspectives. In some cases, the computing device 110 may capture more than two images of the objects 120, 130. For example, the computing device 110 may be configured to capture video and may record video of the object as the computing device is moved to different locations. In such a case, if the computing device 110 captures 30 frames of video per second and records 5 seconds of video of the objects 120, 130, the computing device 110 will capture 150 images of the objects 120, 130. In some examples, the computing device 110 itself may not have a camera, but may instead receive keyframes from another device or may obtain keyframes from a computer-readable medium, such as a hard drive or a flash memory device. In these examples, the computing device 110 captures the images when it receives them from the other device or when it reads them from the computer-readable medium. For example, some suitable means for capturing keyframes include network interfaces and electrical interconnections between the network interfaces and a processor of the computing device. Some other suitable means for capturing keyframes include circuitry for accessing images stored on a computer-readable media, such as a hard disk or a flash drive, or in a database.

Certain images may be referred to herein as "keyframes." A set of keyframes as discussed herein refers to a set of images which capture information sufficient to create a 3D model of an object or scene, or a portion of an object or scene. Such keyframes may simply be taken periodically, may be selected after analysis by a processor, or may be selected manually by a user. In certain examples, keyframes may be selected so that occluded portions of an object or scene from one keyframe are verified to be captured by at least one other keyframe. In certain examples, keyframes may be frames that meet threshold characteristics related to blur, depth errors, occlusion characteristics, object distance, object angle, or any other such relevant characteristics.

After the computing device 110 captures the keyframes, the method proceeds to block 220.

Figure 4B:
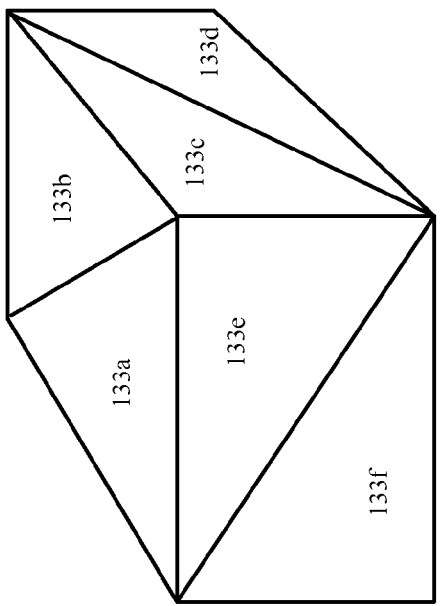
FIGS. 4A-4B shows an example object and a 3D representation of the object.
Figure 4A:
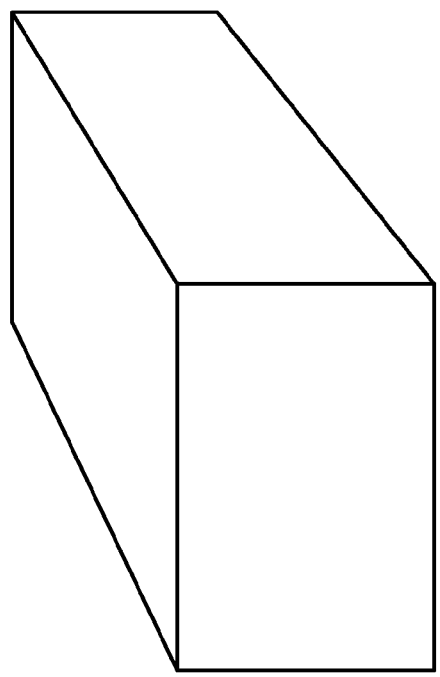

At block 220, the computing device accesses a 3D representation of the object comprising a surface mesh model for the object. For example, referring to FIG. 2A, after the computing device 110 has captures images of the scene 100 and object 130, the computing device 110 generates a 3D triangular mesh representation of the scene, including object, though in some examples, the computing device may only generate a 3D triangular mesh representation of the object itself. For example, the computing device 100 may compute a 3D triangular mesh for the scene according to known methods or may transmit information to another computing device, which generates the 3D triangular mesh for the scene. Referring now to FIGS. 4A-4B, an example surface mesh 402 for object 130 is shown. In this example, the surface mesh 402 includes a number of polygons 133*a-f*, triangles in this example, each having three vertices. In other examples, a 3D representation may include a surface mesh that includes other kinds of polygons.

In some aspects, the computing device 110 may access a previously-generated 3D representation of the object in a computer-readable medium or from a data store. In some aspects, the computing device 110 may generate a 3D mesh using polygons other than triangles or may access a 3D mesh comprising polygons other than triangles. For example, suitable means for accessing a 3D representation of the object comprising a surface mesh model include circuitry for accessing the 3D representation stored on a computer-readable media, such as a hard disk or a flash drive, or in a database.

After the computing device 110 captures the keyframes, the method proceeds to block 230.

At block 230, the computing device 110 begins processing the polygons in the 3D representation of the object. The computing device performs the functionality of block 232 for each polygon in the 3D representation. Thus, at block 230, the computing device 110 determines whether any polygons in the 3D representation have not been processed. If any polygons remain to be processed, the computing device selects a polygon from the 3D representation and the method 300 proceeds to block 232, otherwise it proceeds to block 240.

Figure 2B:
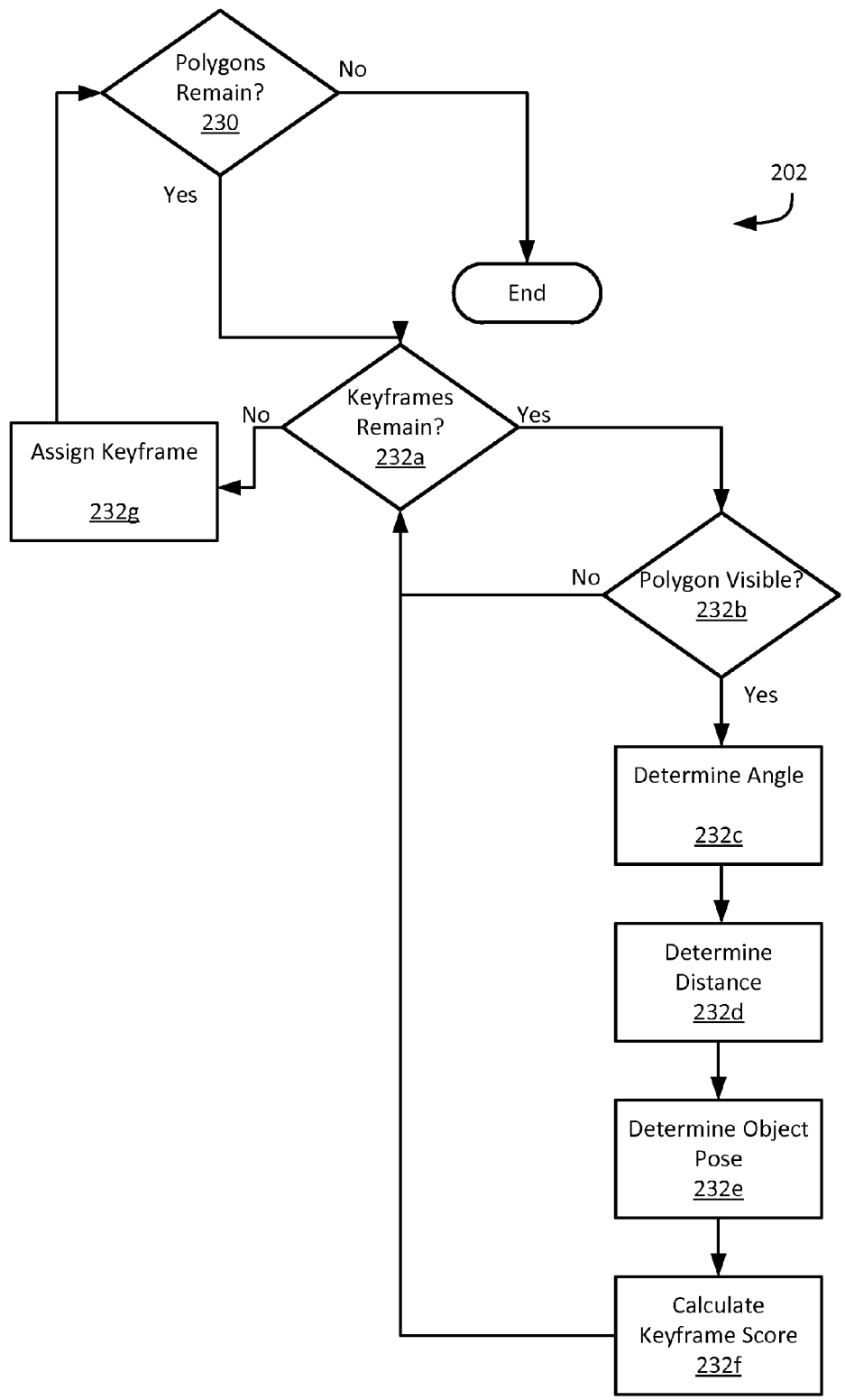

At block 232, the computing device 110 assigns one of the plurality of keyframes to the polygon based on one or more image quality characteristics associated with a portion of the keyframe corresponding to the polygon. According to this example, the computing device 110 analyzes each keyframe to determine whether the keyframe should be assigned to the polygon. Referring now to FIG. 2B, FIG. 2B shows an example method 202 for assigning a keyframe to a polygon. The method 202 shown in FIG. 2B may be employed as a part of the functionality of blocks 230, 232 of method 200 of FIG. 2A. In some examples, a means for assigning one of the plurality of keyframes to the polygon may implement the method 202 of FIG. 2B as software executed by a processor.

The method 202 of FIG. 2B begins in block 230 where the computing device 110 selects a polygon from the 3D representation of the object. After a polygon has been selected, the method proceeds to block 232*a*.

Figure 4D:
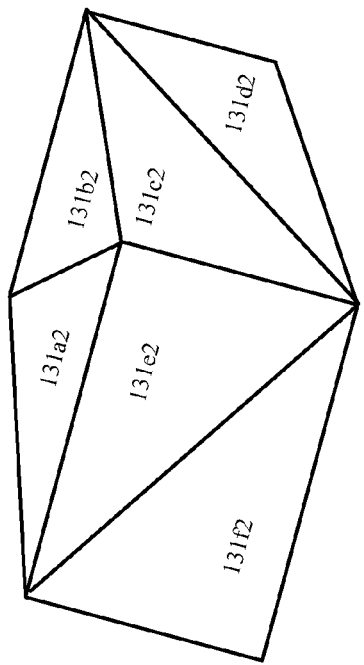
FIGS. 4C-4D show example keyframes of the object including the 3D representation of the object.
Figure 4C:
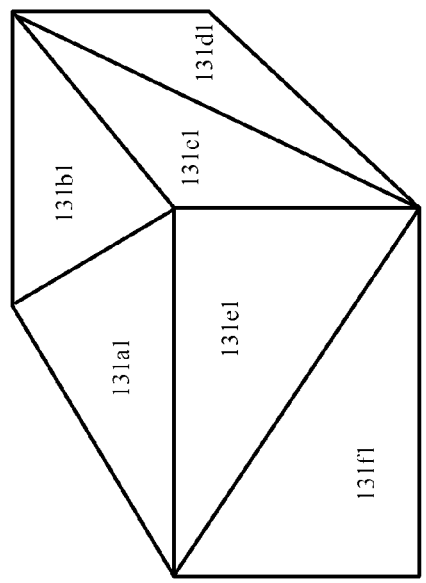

At block 232*a*, the computing device 110 determines whether any keyframes remain to be analyzed. In some aspects, as will be described in more detail with respect to method 200, some keyframes may be marked as ineligible for assigning, which are not considered as remaining, despite having not been processed for assigning to a polygon. For example, the computing device 110 may have captured two keyframes from different perspectives, such as the two keyframes 410, 420 shown in FIGS. 4C and 4D. At block 232*a*, one of these keyframes 410, 420 may be selected for processing. If keyframes remain to be analyzed, the computing device 110 selects one of the keyframes and the method 202 proceeds to block 232b, otherwise the method 202 proceeds to block 232g.

At block 232b, the computing device 110 determines whether the polygon is visible in the keyframe. In this example, the computing device 110 determines whether the polygon is entirely visible in the keyframe or if it has been partially or completely occluded. If the polygon is not entirely visible in the keyframe, the keyframe is determined to be unsuitable for further processing. In some examples, however, if a polygon is only partially occluded, the computing device 110 may determine how much of the polygon is visible within the keyframe and if a sufficient percentage or sufficient number of vertices of the polygon are visible, the keyframe may be suitable for further processing. To determine whether the polygon is sufficiently visible, the computing device may compare a percentage of the polygon that is visible in the keyframe, or a number of vertices of the polygon that are visible, to a predefined or adjustable threshold. In some aspects, multiple characteristics may be analyzed, such as the percentage of the polygon that is visible, a number of vertices of the polygon that are visible, a distance of the polygon from the viewpoint, or other characteristics and compare each to a threshold or to determine a score, where the score is then compared to a threshold. One or more of the thresholds may be predefined or adjustable, such as by a user.

If the polygon is sufficiently visible in the keyframe, the method 202 proceeds to block 232c. If the polygon is not sufficiently visible in the keyframe, the computing device 110 assigns a minimum score to the keyframe, or otherwise excludes the keyframe from further consideration, and the method 202 returns to block 232a.

At block 232c, the computing device 110 calculates an angle between the plane of the polygon and the plane of the image. For example, to calculate the angle, the computing device 110 may calculate a vector normal to the polygon and a ray normal to the plane of the image and calculate an angle between the normal vector and the ray. After calculating the angle, the method 202 proceeds to block 232d.

At block 232d, the computing device 110 determines a distance of the polygon from the viewpoint. In one example, the computing device 110 accesses a depth map associated with the scene and determines the distance based on the depth map. In some examples, the computing device 110 may calculate a distance from the viewpoint relative to other polygons in the 3D representation of the object, such as a depth in pixels based on a position of a vertex nearest to the viewpoint for the keyframe. In some aspects, the 3D representation may include (x, y, z) coordinates for each polygon and a distance may be calculated from the vertex nearest to the viewpoint for the keyframe to a location within the polygon, such as a centroid of the polygon. After the computing device 110 has determined a distance of the polygon from the viewpoint, the method proceeds to block 232e.

At block 232e, the computing device 110 determines a view error associated with the keyframe. In this example, the computing device 110 determines a view error based on a pose of the object in the keyframe and an error in a depth map. For example, the computing device 110 may determine a pose based on the 3D representation and the keyframe. Further, in some examples, the computing device 110 may receive a pose of the object from another processor or software, such as simultaneous localization and mapping ("SLAM") software. Further, as discussed above, in some examples, the computing device 110 may also have access to a depth map, which may be used to compute the view error. In aspects where a depth map is available, the computing device 110 may determine a view error based only on the pose of the object in the keyframe, or based on the pose and other parameters. For example, the computing device 110 may determine a view error by computing a pose parameter and a depth map error parameter and determine the view error: view error=pose*depth map error. In other examples, different calculations may be employed to determine the view error.

After the computing device 110 has determined the view error at block 232e, the method 202 proceeds to block 232f.

At block 232f, the computing device 110 calculates a keyframe score. The keyframe score, in some examples, represents a quality parameter for the keyframe based on one or more inputs. In this example, the keyframe score is based on the outputs of blocks 232c-e, though in other examples, one or more of these blocks 232c-e may be eliminated or replaced by other suitable determinations related to a quality of a keyframe. For example, because in some cases, a 3D representation of an object may comprise many more polygons than keyframes, keyframes may be assigned to more than one polygon. Thus, in some aspects, a weighting factor for a keyframe score may be used based on whether the keyframe has already been assigned to a polygon. In some cases, the weighting factor may change based on the number of polygons to which the keyframe has already been assigned.

In this example, the computing device 110 calculates a keyframe score according to the formula: score=angle*(distance)$^2$*view error. After the computing device 110 has calculated the keyframe score at block 232f, the method 202 returns to block 232a.

At block 232g, the computing device 110 assigns a keyframe to the polygon. After the computing device 110 has processed all of the keyframes for a polygon, the computing device 110 determines which keyframe has the best score. In some aspects, a lower score may represent a better keyframe, while in other aspects a higher score may represent a better keyframe. Thus, based on the scores of the keyframes, the computing device 110 determines a keyframe to assign to the polygon. For example, the keyframe with the best or most optimal score of the keyframe scores is assigned to the polygon.

In some cases, however, no keyframe may be assigned to a polygon. For example, if a polygon is occluded in all keyframes, no keyframe will be assigned to it. Such a polygon will be tagged and removed from any further processing according to this example.

After the computing device 110 has assigned the keyframe, the method 202 completes. If the method 202 was performed as a part of the method 200 shown in FIG. 2A, the computing device 110 proceeds to the next step in the method 200 of FIG. 2A.

Referring again to FIG. 2A, after the computing device 110 has assigned a keyframe to a polygon at block 232, the method returns to block 230 to process any remaining polygons. In this example, any remaining polygons are processed as described above with respect to block 232. Once all polygons have been assigned to a keyframe, the method 200 proceeds to block 240.

At block 240, the computing device 110 begins to process keyframes to reduce the number of keyframes assigned to polygons by entering a processing loop comprising blocks 240-244. In some aspects, a means for reducing a number of assigned keyframes by changing associations between assigned keyframes and the plurality of polygons comprises software for executing the processing loop comprising blocks 240-244 on a processor. At block 240, the computing device 110 determines whether additional keyframes should be eliminated, such as by determining a number of remaining keyframes and comparing the number of remaining keyframes to a threshold value. In some aspects the threshold value may be preconfigured or adjustable, such by a user. In some aspects, the computing device 110 establishes a number of keyframes to remove, such as by establishing a percentage of the total number of assigned keyframes resulting from the processing blocks 230 and 232.

In this example, the computing device 110 ranks the keyframes according to a number of polygons associated with each keyframe. The computing device 110 then selects the keyframe having the fewest number of associated polygons and determines whether the number of associated polygons exceeds a threshold. If the number of associated polygons meets or exceeds the threshold, the computing device 110 determines that no additional keyframes should be removed, but if the number of associated polygons is less than the threshold, the computing device determines that additional keyframes should be removed.

In some examples, the computing device 110, while performing the processing look of blocks 230-232, may store, for each polygon, a list of keyframes and associated scores with respect to the polygon. The computing device 110 may then examine each polygon associated with a particular keyframe to determine whether the polygons have alternate keyframes with scores within a threshold percentage of score of the associated keyframe. For each polygon with an acceptable alternate keyframe, the computing device may increment a counter and, after analyzing each polygon associated with the keyframe, analyze whether the counter represents a percentage of the associated polygons with acceptable alternate keyframes that satisfies a threshold percentage. Thus, the computing device 110 may be able to determine whether removing a particular keyframe would result in a substantial reduction in quality of output prior to selecting the keyframe to be removed.

If the computing device 110 determines that additional keyframes should be removed, the method 200 proceeds to block 242. If the computing device 110 determines that no additional keyframes should be removed, the method 200 proceeds to block 250.

At block 242, the computing device 110 identifies a keyframe to remove. In this example, the computing device 110 ranks the keyframes according to a number of polygons associated with each keyframe. The computing device 110 then selects the keyframe having the fewest number of associated polygons. In some examples, the computing device 110 may select any keyframe assigned to fewer than a threshold number of polygons. In some example, the computing device 110 may select multiple keyframes to be removed in a single step. For example, the computing device 110 may select all keyframes that are associated with fewer than a threshold number of keyframes.

After selecting a keyframe to be removed, the method 200 proceeds to block 244.

Figure 4E:
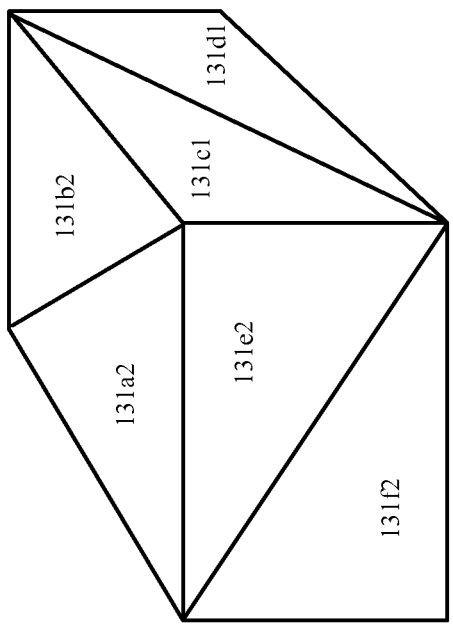
FIG. 4E shows an example 3D representation of the object with textures from keyframes assigned to polygons of the 3D representation of the object.

At block 244, the computing device 110 reassigns the polygons associated with the keyframe(s) to be removed. To reassign the polygons in this example, the computing device 110 re-executes the functionality of processing loop 230-232 for each polygon assigned to the keyframe(s) to be removed, but presets the keyframe(s) to be removed to have a minimal score, or otherwise marks the keyframe(s) to be removed as ineligible for assigning. Thus, as the processing loop 230-232 executes to reassign the polygons to new keyframes, not all keyframes are processed, but only keyframes that have not been marked as ineligible. Further, as discussed above, in some cases, an alternate suitable keyframe may not be available for one or more polygons. In some examples, such polygons are not further processed by the computing device 110 as a part of the method 200. In some aspects, the computing device 110 may maintain a parameter or count of the number of polygons that are unassociated with a keyframe. Referring now to FIG. 4E, FIG. 4E shows an example assignment of polygons to keyframes and the associated textures from the keyframes. In the example shown in FIG. 4E, polygons 131a-b, e-f have been assigned to one keyframe 320, while polygons 131c-d have been assigned to the other keyframe 330.

After the polygons assigned to the selected keyframe(s) have been removed, the method returns to block 240.

At block 250, the computing device 110 enters another processing loop. At block 250, the computing device 110 begins to process polygons to equalize texture colors for the polygon. At block 250, the computing device 110 determines whether additional polygons remain to be processed. In this example, the computing device 110 excludes from processing any polygons that are not associated with any keyframes. If additional polygons remain to be processed, the method 200 proceeds to block 252, otherwise the method 200 ends.

At block 252, the computing device 110 equalizes a texture color of at least a portion of the polygon based on a texture color of a portion of the keyframe associated with the polygon and assigns the equalized texture color to the 3D representation of the object.

In this example, the computing device 110 determines a weighted texture color associated with each vertex of the polygon based on the texture for the polygon from all keyframes in which the vertex is not occluded. In some aspects, the computing device 110 may only employ keyframes for which the angle between the normal vector of the polygon and the plane of the keyframe is less than a threshold, such as 85 degrees, which may be predefined or adjustable. In this example, the computing device 110 uses all keyframes for this step, not the reduced set of polygons generated previously, though in some aspects, the computing device 110 may use the reduced set of polygons.

To compute the weighted texture color for the vertices of a polygon in this example, the computing device 110 determines, for each keyframe, an angle between the normal vector for the polygon and the plane of the keyframe. The angle is then converted to a weight parameter and, for each vertex of the polygon that is not occluded in the keyframe, multiplied against the texture color of the pixel in the keyframe corresponding to the vertex. The weighted texture colors are then summed and averaged to generate a texture color for the vertex.

After determining weighted texture colors for the vertices of a polygon, the computing device 110 compares the weighted average texture color of each vertex to the texture color of the corresponding pixel in the keyframe associated with the polygon and determines an equalization multiplier based on the difference between the vertex's calculated weighted average texture color and the pixel's texture color, thus generating equalization multipliers for each vertex of the polygon. In some aspects, the equalization multiplier may be calculated as the ratio between the pixel's weighted average texture color and the texture color of the corresponding pixel in the keyframe associated with the polygon, while in some aspects the equalization multiplier may be based on such a ratio and other parameters, such as the score for the keyframe with respect to the polygon. The equalization multipliers are then associated with the vertices. After the computing device 110 equalizes the texture color of the vertices of a polygon at block 252, the method 200 returns to block 250.

Once all polygons have been processed, the method 200 proceeds to block 260.

At block 260, the computing device 110 stores the equalized texture color information. For example, the computing device 110 may store the equalization multiplier as a vertex parameter within the 3D representation. In some examples, the computing device 110 may store the equalization multipliers in a separate data structure that is associated with the 3D representation, such as in a separate file or separate database record (or records).

After the equalized texture color information has been stored, the method 200 ends.

Figure 3:
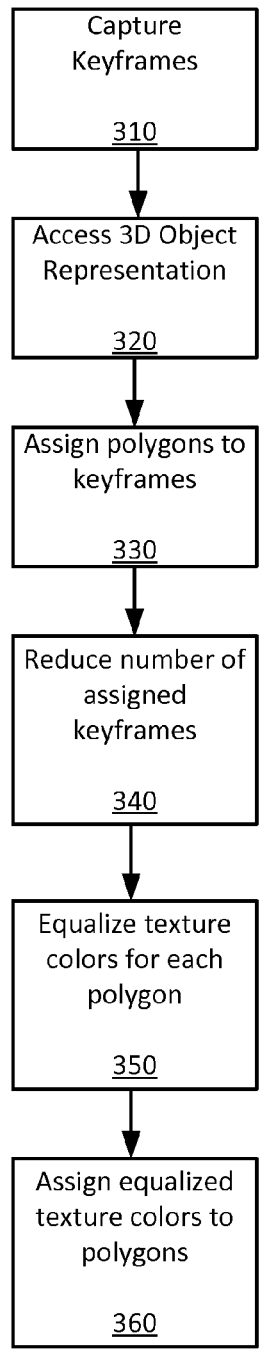

Referring now to FIG. 3, FIG. 3 shows an example method 300 for view independent color equalized 3D scene texturing. The method 300 of FIG. 3 may be performed by any suitable computing device or within a suitable computing environment, such as those discussed below with respect to FIGS. 7-9. As part of various examples, suitable devices or systems may be used. Certain examples may use aspects of SLAM (Simultaneous Location and Mapping) or PTAM (Parallel Tracking and Mapping) systems as means of identifying a camera pose or a position of the camera relative to a captured object or scene. Various alternative examples may also use these mapping systems to create a geometric model of a system, or for collecting various data that may be used for creation of a 3D model.

The method 300 of FIG. 3 begins in block 310 when a computing device, such as computing device 110, with a camera captures a plurality of keyframes of an object as described above with respect to block 210 of FIG. 2.

After the computing device 110 captures the keyframes, the method proceeds to block 320.

At block 320, the computing device 110 accesses a 3D representation of the object comprising a surface mesh model for the object as described above with respect to block 220 of FIG. 2.

After the computing device 110 accesses the 3D representation of the object, the method proceeds to block 330.

At block 330, the computing device 110, for each polygon in a first set of polygons of the plurality of polygons, assigning one of the plurality of keyframes to the polygon based on one or more image quality characteristics associated with a portion of the keyframe corresponding to the polygon as described above with respect to blocks 230-232 of the method 200 of FIG. 2A or method 202 of FIG. 2B. In some examples, as described above, no keyframe may be associated with a polygon, such as due to occlusion of the polygon in all keyframes. Thus, a first set of polygons of the plurality of polygons may comprise polygons that are not occluded in at least one keyframe. In some examples, while a keyframe may be visible in at least one keyframe, a score for such keyframes may be below a threshold, and thus, no keyframe may be assigned to the polygon. Thus, a first set of polygons of the plurality of polygons may comprise polygons that have an assigned polygon.

After the computing device 110 assigns keyframes to polygons at block 330, the method proceeds to block 340.

At block 340, the computing device 110 reduces a number of assigned keyframes by changing associations between assigned keyframes and for a second set of polygons of the plurality of polygons as described above with respect to blocks 240-244 of the method 200 of FIG. 2A. In one example, the computing device 110 identifies a keyframe to remove. In this example, the computing device 110 ranks the keyframes according to a number of polygons associated with each keyframe. The computing device 110 then selects the keyframe having the fewest number of associated polygons. In some examples, the computing device 110 may select any keyframe assigned to fewer than a threshold number of polygons. In some example, the computing device 110 may select multiple keyframes to be removed in a single step. For example, the computing device 110 may select all keyframes that are associated with fewer than a threshold number of keyframes.

The computing device 110 then reassigns the polygons associated with the keyframe(s) to be removed. To reassign the polygons in this example, the computing device 110 re-executes the functionality of processing loop 230-232 for each polygon assigned to the keyframe(s) to be removed, but presets the keyframe(s) to be removed to have a minimal score, or otherwise marks the keyframe(s) to be removed as ineligible for assigning. Thus, as the processing loop 230-232 executes to reassign the polygons to new keyframes, not all keyframes are processed, but only keyframes that have not been marked as ineligible. Further, as discussed above, in some cases, an alternate suitable keyframe may not be available for one or more polygons. In some examples, such polygons are not further processed by the computing device 110 as a part of the method 200. In some aspects, the computing device 110 may maintain a parameter or count of the number of polygons that are unassociated with a keyframe.

In this example, and in some instances, after reducing the number of keyframes, one or more polygons may no longer have an assigned keyframe. Thus, the remaining polygons having an assigned keyframe represents a second set of polygons of the plurality of polygons.

After the number of keyframes has been sufficiently reduced, such as based on a predetermined threshold, the method 300 proceed to block 350.

At block 350, for each polygon of the surface mesh model having an assigned keyframe, the computing device 110 equalizes a texture color of at least a portion of the polygon based at least in part on one or more image quality characteristics of the plurality of keyframes associated with the polygon as described above with respect to blocks 250-252 of the method 200 of FIG. 2.

After the computing device 110 has completed the processing at block 350, the method 300 proceeds to block 360.

At block 360, the computing device 110 assigns the equalized texture color to the 3D representation of the object as described above with respect to blocks 250-260 of the method 200 of FIG. 2A.

Figure 5:
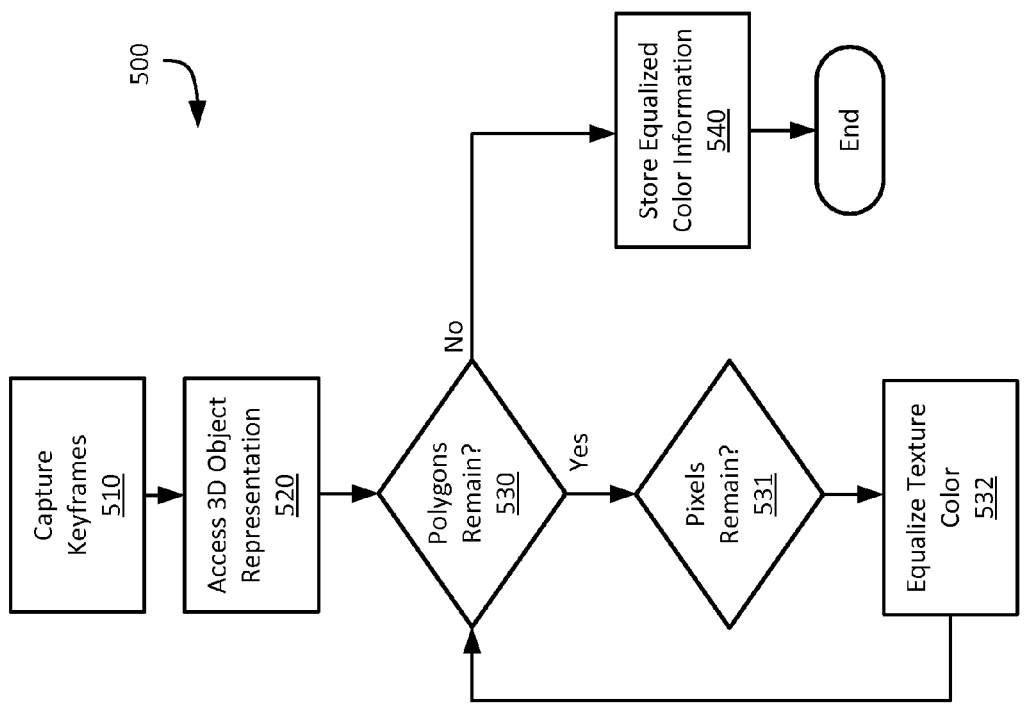
FIGS. 5-6 show example methods for view independent color equalized 3D scene texturing.

Referring now to FIG. 5, FIG. 5 shows an example method 500 for view independent color equalized 3D scene texturing. The method 500 of FIG. 5 may be performed by any suitable computing device or within an suitable computing environment, such as those discussed below with respect to FIGS. 7-9. As part of various examples, suitable devices or systems may be used. Certain examples may use aspects of SLAM (Simultaneous Location and Mapping) or PTAM (Parallel Tracking and Mapping) systems as means of identifying a camera pose or a position of the camera relative to a captured object or scene. Various alternative examples may also use these mapping systems to create a geometric model of a system, or for collecting various data that may be used for creation of a 3D model.

The method 500 of FIG. 5 begins in block 510 when a computing device, such as computing device 110, with a camera captures a plurality of keyframes of an object as described above with respect to block 210 of FIG. 2.

After the computing device 110 captures the keyframes, the method proceeds to block 520.

At block 520, the computing device 110 accesses a 3D representation of the object comprising a surface mesh model for the object as described above with respect to block 220 of FIG. 2.

After the computing device 110 accesses the 3D representation of the object, the method proceeds to block 530.

At block 530, the computing device 110 begins processing the polygons in the 3D representation of the object. The computing device performs the functionality of block 532 for each polygon in the 3D representation. Thus, at block 530, the computing device 110 determines whether any polygons in the 3D representation have not been processed. If any polygons remain to be processed, the computing device selects a polygon from the 3D representation and the method 500 proceeds to block 531, otherwise the method proceeds to block 540.

At block 531, the computing device 110 equalizes the texture color of one of the polygon in the 3D representation of the object. According to this example, the computing device 110 analyzes each polygon to determine equalized texture colors for pixels within the polygon (as opposed to only the vertices of the polygon), and in some examples all pixels within a polygon.

At block 532, the computing device 110 calculates a weighted average texture color for each pixel in a selected polygon. In this example, the computing device 110 determines a weighted texture color associated with the pixel based on all keyframes in which the pixel is not occluded. In some aspects, the computing device 110 may only employ keyframes for which the angle between the normal vector of the polygon and the plane of the keyframe is less than a threshold, such as 85 degrees, which may be predefined or adjustable. In this example, however, the computing device 110 uses all keyframes for this step.

To compute the weighted texture color for the pixel in this example, the computing device 110 determines, for each keyframe, an angle between the normal vector for the polygon and the plane of the keyframe. The angle is then converted to a weight parameter and multiplied against the texture color of the pixel in the keyframe. The weighted texture colors are then summed and averaged to generate a texture color for the pixel. The determined texture color value is then assigned to the pixel as a part of the 3D representation. For example, the computing device 110 may store the texture color value as a part of a texture to be applied to the polygon within the 3D representation. In some examples, the computing device 110 may store the texture color values in a separate data structure that is associated with the 3D representation, such as in a separate file or separate database record (or records).

The method 500 of FIG. 5 may provide a more computationally-expensive approach to view independent color equalized 3D scene texturing but may consider additional data when equalizing texture colors. Further, in some examples, the method 200 of FIG. 2A may be combined with the method 500 of FIG. 5. For example, while the method of FIG. 2A assigns keyframes to polygons, the method of FIG. 5 may be expanded to assign keyframes to individual pixels and perform the functionality of the method 202 shown in FIG. 2B on a per-pixel basis rather than a per-polygon basis. Further, such a combined method may not reduce the number of keyframes, though in some examples in addition to assigning keyframes to individual pixels, the computing device 110 may also reduce the number of keyframes by performing the functionality of blocks 240-244 on a per-pixel basis. Thus, a hybrid method that performs a per-pixel analysis as described in FIG. 5 but incorporates one or more aspects of keyframe assignment, keyframe reassignment, or texture color equalization as described with respect to FIGS. 2A-2B may be implemented according to one or more examples.

Figure 6:
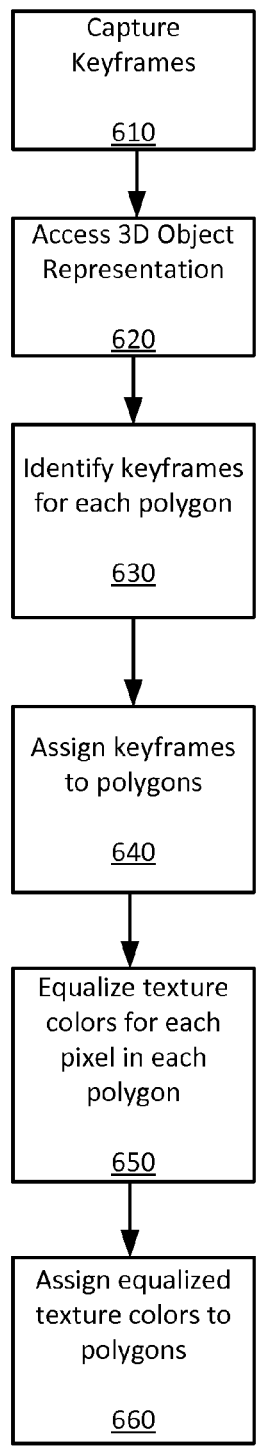

Referring now to FIG. 6, FIG. 6 shows an example method 600 for view independent color equalized 3D scene texturing. The method 600 of FIG. 6 may be performed by any suitable computing device or within any suitable computing environment, such as those discussed below with respect to FIGS. 7-9. As part of various examples, suitable devices or systems may be used. Certain examples may use aspects of SLAM (Simultaneous Location and Mapping) or PTAM (Parallel Tracking and Mapping) systems as means of identifying a camera pose or a position of the camera relative to a captured object or scene. Various alternative examples may also use these mapping systems to create a geometric model of a system, or for collecting various data that may be used for creation of a 3D model.

The method 600 of FIG. 6 begins in block 610 when a computing device, such as computing device 110, with a camera captures a plurality of keyframes of an object as described above with respect to block 210 of FIG. 2.

After the computing device 110 captures the keyframes, the method proceeds to block 620.

At block 620, the computing device 110 accesses a 3D representation of the object comprising a surface mesh model for the object as described above with respect to block 220 of FIG. 2.

After the computing device 110 accesses the 3D representation of the object, the method proceeds to block 630.

At block 630, the computing device 110, for each polygon in a first set of polygons of the plurality of polygons, identifies one or more keyframes associated with the polygon. For example, computing device 110 identifies all keyframes in which the polygon is not occluded. In some examples, the computing device 110 identifies one or more keyframes for which the angle between the normal vector of the polygon and the plane of the keyframe is less than a threshold, such as 85 degrees, which may be predefined or adjustable. As discussed above, in some cases, one or more polygons may not be visible in any keyframes, or may not satisfy one or more quality metrics, such as the describe angle threshold. Thus, such polygons may not be included in the first set of polygons.

After the computing device 110 has identifies one or more keyframes associated with the polygon, the method 600 proceeds to block 640.

At block 640, the computing device 110 assigning one or more keyframes of the identified keyframes based on one or more image quality characteristics of the identified keyframes for a second set of polygons of the plurality of polygons. For example, the computing device 110 may perform the functionality of blocks 230-232 of the method 200 of FIG. 2, however, the computing device 110 may assign every keyframe having a sufficient score to the polygon, rather than only the keyframe having the best score. As discussed above, some polygons may not be assigned a keyframe due to scores for the keyframes not exceeding a minimum threshold score. Thus, the polygons for which one or more keyframes is assigned comprise a second set of polygons.

After the computing device 110 has assigned keyframes to polygons at block 640, the method proceeds to block 650.

At block 650, the computing device 110, for each pixel of each polygon in the second set of polygons, calculates a weighted average texture color of the pixel based on texture colors of corresponding points on the object in each of the one or more assigned keyframes by performing the functionality of blocks 530-532 of the method 500 of FIG. 5.

After the computing device 110 has calculated the weighted average texture colors, the method 600 proceeds to block 660.

At block 660, the computing device assigns the weighted average texture color to the 3D representation of the object such as by storing the weighted average texture colors associated with the 3D representation of the object in a database or as a part of the 3D representation.

Figure 7:
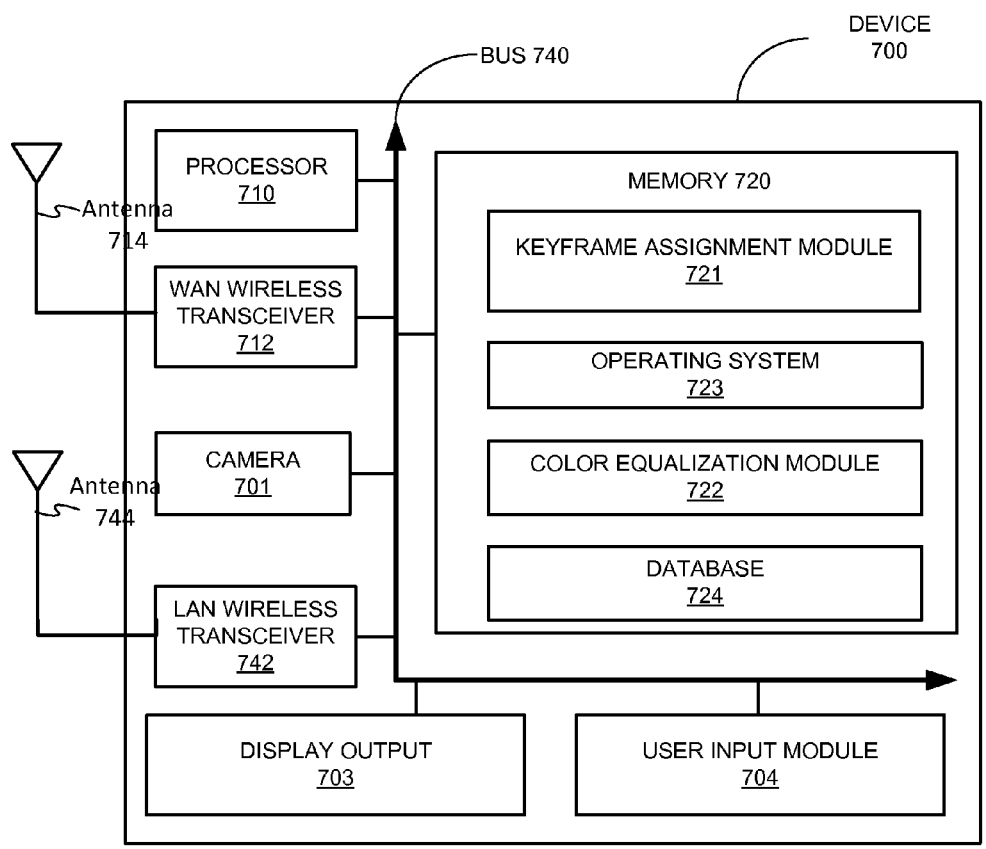
FIGS. 7-8 show example computing devices for view independent color equalized 3D scene texturing.

Referring now to FIG. 7, FIG. 7 shows one example of a computing device 700 for view independent color equalized 3D scene texturing. In this example, the computing device 700 comprises a mobile device, such as a smartphone, that includes a processor 710, a WAN wireless transceiver 512 and an associated antenna 714, a camera 701, a LAN wireless transceiver 742 and associated antenna 744, a display output 703, a user input module 704, and one or more memories configured to store an operating system 523, a keyframe assignment module 721, a color equalization module 722, and a database 724. In this example, the computing device 700 is configured to capture images or video of a real-world environment, or scene, from the perspective of the camera. The processor 710 is configured to execute the keyframe assignment module 721 and the color equalization module 722 to provide view independent color equalized 3D scene texturing. For example, the camera 701 may capture an image or video of an object in a scene, keyframe assignment module 721 may assign keyframes to polygons in a 3D polygon mesh representation of the object, and color equalization module 722 may generate equalized color information for the 3D representation of the object, and may store the equalized color information in the database 724 or may display output 703 in accordance with the embodiments described herein. In some examples, the computing device 700 may be configured to transmit the equalized color information using the WAN wireless transceiver 512 or the LAN transceiver 742.

Figure 8:
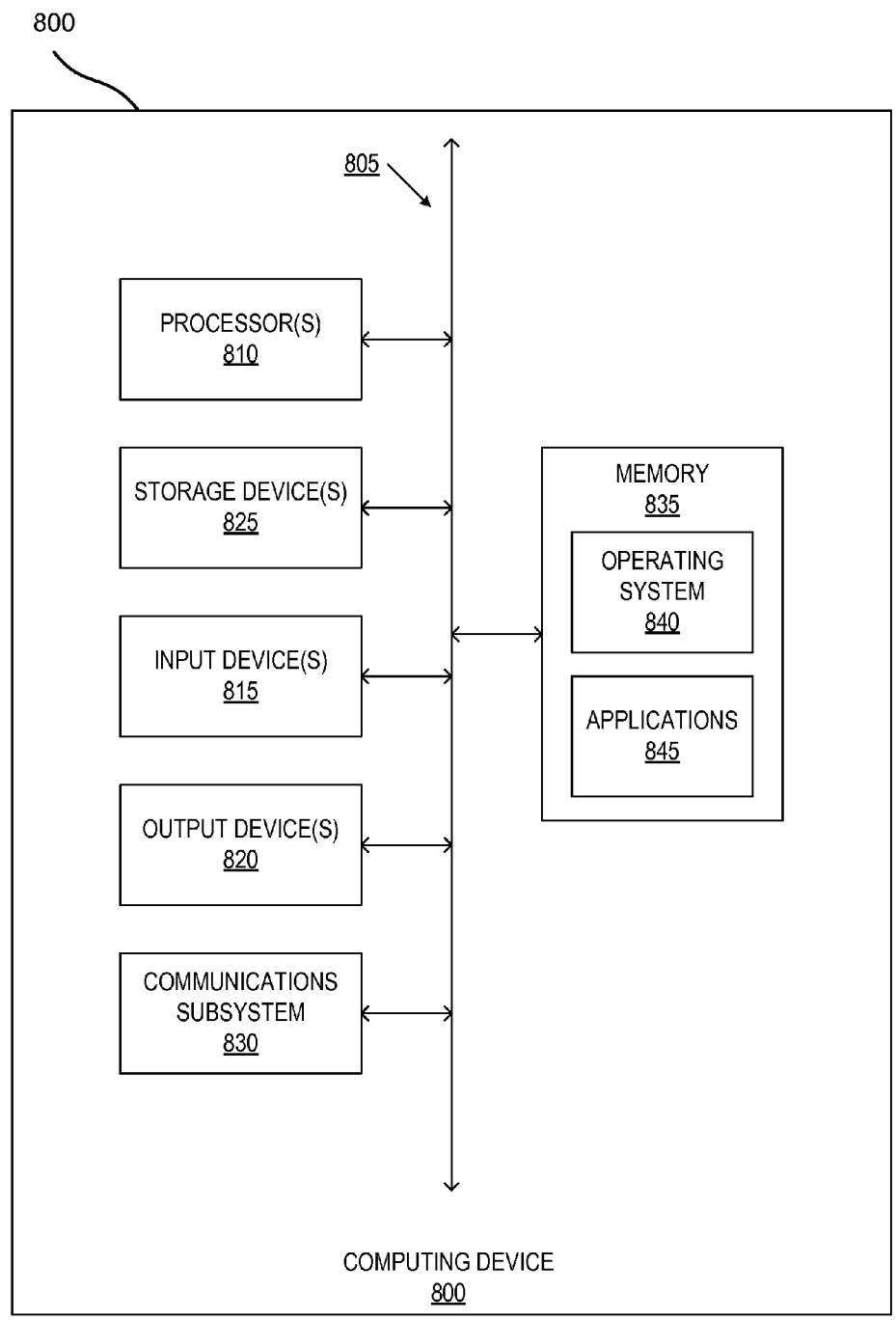

FIG. 8 shows one example of a computing device 800 for view independent color equalized 3D scene texturing. The computing device 110 of FIG. 1 may be connected to a device such as computing device 800, or computing device 110 may be implemented in alternative embodiments according to the details of computing device 800. The computing device 800, in this example, includes one or more processors 810, one or more storage device 825, one or more input device 815, one or more output device 820, a communications subsystem 830, and memory 835, all of which are in communication with each other via one or more communications buses 605. The memory 835 is configured to store program code for execution by one or more of the processors 810, such as an operating system 840 and one or more applications 845. For example, the memory 835 may store a software application for providing view independent color equalized 3D scene texturing according to this disclosure.

Figure 9:
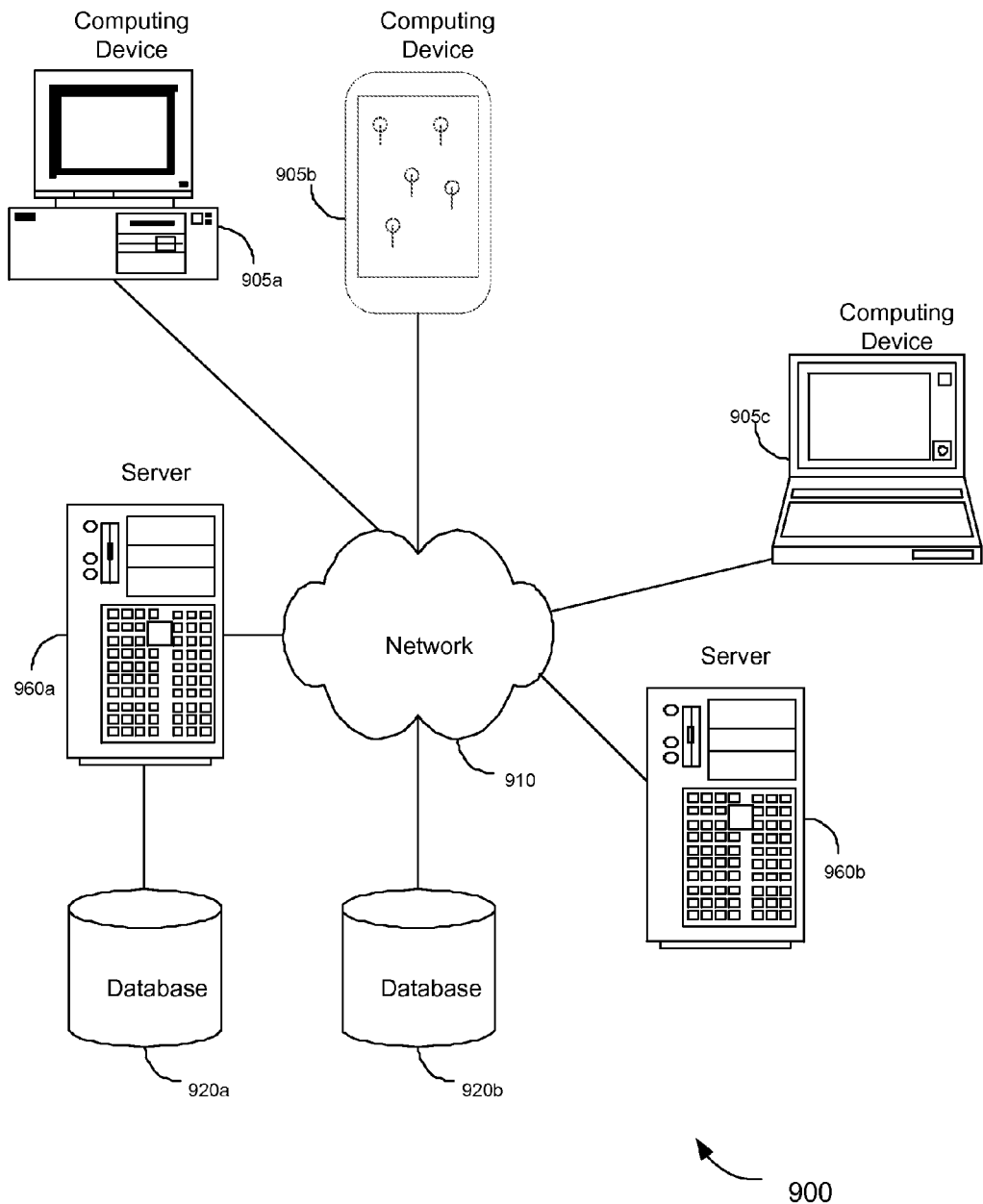
FIG. 9 shows an example distributed environment for view independent color equalized 3D scene texturing.

FIG. 9 shows a network that may be used in conjunction with various examples for view independent color equalized 3D scene texturing, where computing device 110 may be coupled to portions of the network shown in FIG. 9 or may use resources of such a network to performing processing as part of an implementation where portions of the method of FIGS. 2A-2B may be implemented using networked resources. In one example, one or more devices, such as computing device 110, are connected to the network 910.

The computing device 110 is configured to access a 3D representation of an object from one or more data stores, such as databases 920a-b. In some examples, devices may be configured to access the Internet to obtain a 3D object representation, or to store color equalization information.

While the methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

What is claimed is:

1. A method for view independent color equalized three-dimensional scene texturing comprising:
   capturing a plurality of keyframes of an object;
   accessing a three-dimensional ("3D") representation of the object comprising a surface mesh model for the object, the surface mesh model comprising a plurality of polygons;
   for each polygon in a first set of polygons of the plurality of polygons, assigning one of the plurality of keyframes to the polygon based on one or more image quality characteristics associated with a portion of the keyframe corresponding to the polygon;
   reducing a number of assigned keyframes by changing associations between assigned keyframes and a second set of polygons of the plurality of polygons, wherein a first polygon of the second set of polygons is assigned to a first keyframe of the reduced number of assigned keyframes, and a second polygon of the second set of polygons is assigned to a second keyframe of the reduced number of assigned keyframes, the first and second polygons defined by at least a first vertex; and
   for each polygon of the surface mesh model having an assigned keyframe:
      equalizing a texture color of at least a portion of the polygon based at least in part on the keyframe assigned to the polygon; and
      assigning the equalized texture color to the 3D representation of the object, and
   wherein equalizing a texture color of the first polygon is based on a first pixel value for the first vertex based on the first keyframe, and equalizing a texture color of the second polygon is based on a second pixel value for the first vertex based on the second keyframe, the first pixel value different from the second pixel value.

2. The method of claim 1, wherein equalizing the texture color of the polygon comprises:
   calculating a weighted average texture color for each vertex of the polygon based on a subset of the plurality of keyframes, the subset comprising keyframes having a pixel associated with at least one vertex of the polygon;
   calculating a texture color equalization multiplier using the weighted average texture color for each vertex by comparing the weighted average texture color for each vertex to a texture color of associated points on the object from the respective assigned keyframe; and
   applying a texture to the polygon, the applying comprising interpolating the texture color equalization multiplier over pixels in the polygon based on the vertices of the polygon.

3. The method of claim 2, wherein calculating the weighted average texture color for each vertex of the polygon based on a subset of the plurality of keyframes comprises:
   for each vertex:
      for each keyframe of the subset:
         determining a weight associated with the keyframe based on an angle between a vector normal to the polygon and a vector normal to the camera plane; and
         determining a weighted texture color by applying the weight to the texture color of a corresponding point on the object in the keyframe associated with the vertex;
      summing the weighted texture color of each keyframe of the subset; and
      calculating the weighted average texture color for the vertex based on the sum.

4. The method of claim 1, wherein equalizing the texture color of the polygon comprises calculating a new texture for the polygon of the plurality of polygons based on (1) the portion of the keyframe of the reduced set of keyframes associated with the polygon, and (2) a weighted average texture color from the plurality of keyframes for each pixel in the portion of the new texture as associated with pixels from corresponding portions of each of the plurality of keyframes.

5. The method of claim 1, wherein selecting one of the plurality of keyframes comprises:
   determining a score for each of the plurality of keyframes; and
   selecting a keyframe having the best score.

6. The method of claim 5, wherein determining the score comprises:
   determining an angle between a vector normal to the polygon and a vector normal to the camera plane;
   determining a distance to the object from the camera based on a depth map associated with the keyframe;
   determining a depth map error associated with the depth map;
   determining a pose associated with the keyframe; and
   determining the score using the formula: score=angle* $(distance)^2$*depth map error*pose.

7. The method of claim 1, wherein the image quality characteristics comprise at least one of an occlusion value, an object distance, a lighting quality, or a keyframe angle.

8. The method of claim 1, wherein reducing a number of assigned keyframes associated with at least one polygon by changing associations between assigned keyframes and the plurality of polygons comprises eliminating all associations for at least one polygon so that the at least one polygon is not associated with any keyframe.

9. A system for view independent color equalized three-dimensional scene texturing comprising:
   a computer-readable medium; and
   an electronic processor in communication with the computer-readable medium, the electronic processor configured to:
      receive a plurality of keyframes of an object;
      access a three-dimensional ("3D") representation of the object comprising a surface mesh model for the object, the surface mesh model comprising a plurality of polygons;
      for each polygon in a first set of polygons of the plurality of polygons, assign one of the plurality of keyframes to the polygon based on one or more image quality characteristics associated with a portion of the keyframe corresponding to the polygon;
      reduce a number of assigned keyframes by changing associations between assigned keyframes and a second set of polygons of the plurality of polygons,
      wherein a first polygon of the second set of polygons is assigned to a first keyframe of the reduced number of assigned keyframes, and a second polygon of the second set of polygons is assigned to a second keyframe of the reduced number of assigned keyframes, the first and second polygons defined by at least a first vertex; and
      for each polygon of the surface mesh model having an assigned keyframe:

equalize a texture color of at least a portion of the polygon based at least in part on the keyframe assigned to the polygon; and
assign the equalized texture color to the 3D representation of the object, and
wherein equalizing a texture color of the first polygon is based on a first pixel value for the first vertex based on the first keyframe, and equalizing a texture color of the second polygon is based on a second pixel value for the first vertex based on the second keyframe, the first pixel value different from the second pixel value.

10. The system of claim 9, wherein the processor is further configured to:
calculate a weighted average texture color for each vertex of the polygon based on a subset of the plurality of keyframes, the subset comprising keyframes having a pixel associated with at least one vertex of the polygon;
calculate a texture color equalization multiplier using the weighted average texture color for each vertex by comparing the weighted average texture color for each vertex to a texture color of associated points on the object from the respective assigned keyframe; and
apply a texture to the polygon, the applying comprising interpolating the texture color equalization multiplier over pixels in the polygon based on the vertices of the polygon to equalize the texture color of the polygon.

11. The system of claim 10, wherein the processor is further configured to, for each vertex:
for each keyframe of the subset:
determine a weight associated with the keyframe based on an angle between a vector normal to the polygon and a vector normal to the camera plane; and
determine a weighted texture color by applying the weight to the texture color of a corresponding point on the object in the keyframe associated with the vertex;
sum the weighted texture color of each keyframe of the subset; and
calculate the weighted average texture color for the vertex based on the sum to calculate the weighted average texture color for each vertex of the polygon based on a subset of the plurality of keyframes.

12. The system of claim 9, wherein the processor is further configured to calculate a new texture for the polygon of the plurality of polygons based on (1) the portion of the keyframe of the reduced set of keyframes associated with the polygon, and (2) a weighted average texture color from the plurality of keyframes for each pixel in the portion of the new texture as associated with pixels from corresponding portions of each of the plurality of keyframes to equalize the texture color of the polygon.

13. The system of claim 9, wherein the processor is further configured to:
determine a score for each of the plurality of keyframes; and
select a keyframe having the best score to select one of the plurality of keyframes.

14. The system of claim 13, wherein the processor is further configured to:
determine an angle between a vector normal to the polygon and a vector normal to the camera plane;
determine a distance to the object from the camera based on a depth map associated with the keyframe;
determine a depth map error associated with the depth map;
determine a pose associated with the keyframe; and
determine the score using the formula: score=angle*(distance)$^2$*depth map error*pose.

15. The system of claim 9, wherein the image quality characteristics comprise at least one of an occlusion value, an object distance, a lighting quality, or a keyframe angle.

16. The system of claim 9, wherein the processor is further configured to eliminate all associations for at least one polygon so that the at least one polygon is not associated with any keyframe to reduce a number of assigned keyframes associated with at least one polygon by changing associations between assigned keyframes and the plurality of polygons.

17. A non-transitory computer-readable medium comprising processor-executable instructions configured to cause a processor to execute a method for view independent color equalized three-dimensional scene texturing to cause the processor to:
capture a plurality of keyframes of an object;
access a three-dimensional ("3D") representation of the object comprising a surface mesh model for the object, the surface mesh model comprising a plurality of polygons;
for each polygon in a first set of polygons of the plurality of polygons, assign one of the plurality of keyframes to the polygon based on one or more image quality characteristics associated with a portion of the keyframe corresponding to the polygon;
reduce a number of assigned keyframes by changing associations between assigned keyframes and a second set of polygons of the plurality of polygons, wherein a first polygon of the second set of polygons is assigned to a first keyframe of the reduced number of assigned keyframes, and a second polygon of the second set of polygons is assigned to a second keyframe of the reduced number of assigned keyframes, the first and second polygons defined by at least a first vertex; and
for each polygon of the surface mesh model having an assigned keyframe, equalize a texture color of at least a portion of the polygon based at least in part on the keyframe assigned to the polygon; and
for each polygon of the surface mesh model having an assigned keyframe, assign the equalized color to the 3D representation of the object, and
wherein equalizing a texture color of the first polygon is based on a first pixel value for the first vertex based on the first keyframe, and equalizing a texture color of the second polygon is based on a second pixel value for the first vertex based on the second keyframe, the first pixel value different from the second pixel value.

18. The non-transitory computer-readable medium of claim 17, wherein the processor-executable instructions configured to cause the processor to equalizing the texture color of the polygon is further configured to cause the processor to:
calculate a weighted average texture color for each vertex of the polygon based on a subset of the plurality of keyframes, the subset comprising keyframes having a pixel associated with at least one vertex of the polygon;
calculate a texture color equalization multiplier using the weighted average texture color for each vertex by comparing the weighted average texture color for each vertex to a texture color of associated points on the object from the respective assigned keyframe; and
apply a texture to the polygon, the applying comprising interpolating the texture color equalization multiplier over pixels in the polygon based on the vertices of the polygon.

19. The non-transitory computer-readable medium of claim 18, wherein the processor-executable instructions configured to cause the processor to calculate the weighted average texture color for each vertex of the polygon based on a subset of the plurality of keyframes is further configured to cause the processor to:
- for each vertex and for each keyframe of the subset, determine a weight associated with the keyframe based on an angle between a vector normal to the polygon a the vertex and a vector normal to the camera plane; and
- for each vertex and for each keyframe of the subset, determine a weighted texture color by applying the weight to the texture color of a corresponding point on the object in the keyframe associated with the vertex;
- for each vertex, sum the weighted texture color of each keyframe of the subset; and
- program code for, for each vertex, calculating the weighted average texture color for the vertex based on the sum.

20. The non-transitory computer-readable medium of claim 17, wherein the processor-executable instructions configured to cause the processor to equalize the texture color of the polygon comprises processor-executable instructions configured to cause the processor to calculate a new texture for the polygon of the plurality of polygons based on (1) the portion of the keyframe of the reduced set of keyframes associated with the polygon, and (2) a weighted average texture color from the plurality of keyframes for each pixel in the portion of the new texture as associated with pixels from corresponding portions of each of the plurality of keyframes.

21. The non-transitory computer-readable medium of claim 17, wherein the processor-executable instructions configured to cause the processor to select one of the plurality of keyframes comprises processor-executable instructions configured to cause the processor to:
- determine a score for each of the plurality of keyframes; and
- select a keyframe having the best score.

22. The non-transitory computer-readable medium of claim 21, wherein the processor-executable instructions configured to cause the processor to determine the score comprises processor-executable instructions configured to cause the processor to:
- determine an angle between a vector normal to the polygon and a vector normal to the camera plane;
- determine a distance to the object from the camera based on a depth map associated with the keyframe;
- determine a depth map error associated with the depth map;
- determine a pose associated with the keyframe; and
- determine the score using the formula: score=angle*(distance)$^2$*depth map error*pose.

23. The non-transitory computer-readable medium of claim 17, wherein the image quality characteristics comprise at least one of an occlusion value, an object distance, a lighting quality, or a keyframe angle.

24. The non-transitory computer-readable medium of claim 17, wherein the processor-executable instructions configured to cause the processor to reduce a number of assigned keyframes associated with at least one polygon by changing associations between assigned keyframes and the plurality of polygons comprises processor-executable instructions configured to cause the processor to eliminate all associations for at least one polygon so that the at least one polygon is not associated with any keyframe.

* * * * *